(12) United States Patent  (10) Patent No.: US 8,225,506 B2
Chivers et al.  (45) Date of Patent: Jul. 24, 2012

(54) METHOD OF MANUFACTURING A ROTOR FOR A GAS TURBINE ENGINE THAT INCLUDES IDENTIFYING THE FREQUENCY RESPONSE OF THE ROTOR AND ADJUSTING THE FREQUENCY RESPONSE BY PROVIDING A PRESSURE GRADIENT WITHIN THE ROTOR

(75) Inventors: Nigel J.D. Chivers, Chippenham (GB); Keith C. Goldfinch, Bristol (GB)

(73) Assignee: Rolls-Royce PLC, London (GB)

( * ) Notice: Subject to any disclaimer, the term of this patent is extended or adjusted under 35 U.S.C. 154(b) by 941 days.

(21) Appl. No.: 12/216,500

(22) Filed: Jul. 7, 2008

(65) Prior Publication Data

US 2009/0056126 A1 Mar. 5, 2009

(30) Foreign Application Priority Data

Jul. 13, 2007 (GB) .................................. 0713702

(51) Int. Cl.
*F01D 5/16* (2006.01)
(52) U.S. Cl. .................... 29/889.72; 29/889.7; 416/232; 416/233; 416/500; 264/261; 264/267
(58) Field of Classification Search ................ 29/889.7, 29/889.72; 416/232, 233, 500; 264/261, 264/267; *F01D 5/16*
See application file for complete search history.

(56) References Cited

U.S. PATENT DOCUMENTS

| 2,581,193 | A | * | 1/1952 | Le Compte | 264/265 |
| 2,984,453 | A | * | 5/1961 | Heymann | 416/229 R |
| 3,028,661 | A | * | 4/1962 | Turner | 29/889.721 |
| 4,097,192 | A | | 6/1978 | Kulina | |
| 5,042,968 | A | * | 8/1991 | Fecto | 416/226 |
| 5,165,860 | A | * | 11/1992 | Stoner et al. | 416/224 |
| 5,400,296 | A | * | 3/1995 | Cushman et al. | 367/1 |
| 5,820,348 | A | * | 10/1998 | Fricke | 416/248 |
| 5,947,688 | A | * | 9/1999 | Schilling et al. | 416/233 |
| 6,033,186 | A | * | 3/2000 | Schilling et al. | 416/233 |
| 6,039,542 | A | * | 3/2000 | Schilling et al. | 416/233 |
| 6,078,022 | A | * | 6/2000 | Dulaney et al. | 219/121.85 |
| 6,139,278 | A | * | 10/2000 | Mowbray et al. | 416/229 A |
| 6,224,341 | B1 | * | 5/2001 | Fricke | 416/248 |
| 6,233,823 | B1 | * | 5/2001 | Schilling | 29/889.71 |
| 6,282,786 | B1 | * | 9/2001 | Evans et al. | 29/889.72 |
| 6,364,616 | B1 | * | 4/2002 | Stevenson et al. | 416/233 |
| 6,381,196 | B1 | * | 4/2002 | Hein et al. | 367/1 |
| 6,454,536 | B1 | * | 9/2002 | Evans et al. | 416/229 A |
| 6,669,447 | B2 | * | 12/2003 | Norris et al. | 416/224 |
| 7,112,044 | B2 | * | 9/2006 | Whitehead et al. | 416/229 R |
| 7,278,830 | B2 | * | 10/2007 | Vetters | 416/229 R |
| 7,311,500 | B2 | * | 12/2007 | Rongong et al. | 416/230 |

(Continued)

FOREIGN PATENT DOCUMENTS

DE 102005006414 A1 * 8/2006

(Continued)

*Primary Examiner* — David Bryant
*Assistant Examiner* — Jason L Vaughan
(74) *Attorney, Agent, or Firm* — Oliff & Berridge, PLC (57) ABSTRACT

A method of manufacturing a component, the method including the steps of: providing a component having a first portion, which first portion defines a cavity, characterized by; identifying a first frequency response of the first portion and/or the entire component, and introducing material into the cavity to achieve an adjusted frequency response of the first portion and hence a desired frequency response of the component.

17 Claims, 5 Drawing Sheets

U.S. PATENT DOCUMENTS

| | | | |
|---|---|---|---|
| 7,329,102 B2 * | 2/2008 | McMillan et al. | 416/229 A |
| 7,347,664 B2 * | 3/2008 | Kayser et al. | 415/200 |
| 7,594,325 B2 * | 9/2009 | Read | 29/889.71 |
| 7,753,654 B2 * | 7/2010 | Read et al. | 416/229 R |
| 7,794,210 B2 * | 9/2010 | Clark et al. | 416/223 R |
| 2003/0185685 A1 * | 10/2003 | Simon | 416/229 R |
| 2004/0018091 A1 * | 1/2004 | Rongong et al. | 416/229 A |
| 2004/0208741 A1 | 10/2004 | Barb | |
| 2005/0042384 A1 * | 2/2005 | Benedetti et al. | 427/446 |
| 2005/0186082 A1 * | 8/2005 | Kayser et al. | 416/241 R |
| 2006/0029501 A1 | 2/2006 | Burdgick et al. | |
| 2006/0104818 A1 * | 5/2006 | McMillan et al. | 416/232 |
| 2008/0134504 A1 * | 6/2008 | Schoenenborn | 29/889.1 |
| 2009/0035138 A1 * | 2/2009 | Harrison et al. | 416/204 A |

FOREIGN PATENT DOCUMENTS

| | | |
|---|---|---|
| EP | 1 217 171 A2 | 6/2002 |
| GB | 1 550 597 A | 8/1979 |

* cited by examiner

METHOD OF MANUFACTURING A ROTOR FOR A GAS TURBINE ENGINE THAT INCLUDES IDENTIFYING THE FREQUENCY RESPONSE OF THE ROTOR AND ADJUSTING THE FREQUENCY RESPONSE BY PROVIDING A PRESSURE GRADIENT WITHIN THE ROTOR

The present invention relates to a method of manufacturing a component. The invention is particularly, although not exclusively, concerned with components for use in gas turbine engines, for example, fan blades.

In U.S. Pat. No. 6,033,186, a fan blade is manufactured by creating a rib structure containing open pockets subsequently filled with light-weight filler. The filler 40 is inserted into the open pockets in the blade and finished to form part of the surface of the aerofoil.

A problem with the blade of U.S. Pat. No. 6,033,186 and other known blades is that common manufacturing processes result in the blades having substantially similar frequency responses. Specifically, the blades will exhibit high amplitude oscillations at certain resonant frequencies.

A plurality of blades such as those in U.S. Pat. No. 6,033,186 are assembled circumferentially about a common hub, or disc, to create a blade assembly. As each blade exhibits high amplitude oscillations at certain frequencies, the resulting assembly will also exhibit high amplitude oscillations at, or near, those frequencies as the blades oscillate in unison. This is highly undesirable as if the oscillations occur in phase, the entire assembly will oscillate, and the resulting motion can cause a high level of strain on neighbouring components (eg the engine shaft) and the blades themselves.

It will also be noted that this problem also occurs when the blades and disc are a unitary component (a blisk) and in static vane assemblies.

A proposed solution to this problem is to manufacture the individual blades to varying standards at the initial manufacturing stage, ie at the metal forming (eg forging) stage. This involves introducing variations in the blade shape and hence altering the frequency response. This is problematic as blades have an optimum shape for a desired performance, and to vary the manufacturing standard inevitably deviates from this standard. Therefore the blade will not perform as well and the efficiency and effectiveness of the assembly and hence the fan or compressor will be reduced. Furthermore, the cost and additional timescales involved in designing and manufacturing blades to more than one standard are significant. Still further, in-service blade replacement stocks are forced to hold more than one blade as it is generally unknown which blade, and hence which standard, will need to be replaced in the event of failure or damage.

A further problem with known fan blades is that torsional and bending vibration modes can have similar frequencies. As such, at those frequencies, a combination of bending and torsion vibration may cause flutter, which is highly undesirable in aircraft applications for the above mentioned reasons.

It is an object of the present invention to overcome one or more of these disadvantages.

A first aspect of the invention provides a method of manufacturing a component, the method comprising the steps of: providing a component having a first portion, which first portion defines a cavity, characterised by; identifying a first frequency response of the first portion and/or the entire component, and introducing material into the cavity to achieve an adjusted frequency response of the first portion and hence a desired frequency response of the component.

In this manner, portions such as individual blades, or blades on a blisk, may be initially manufactured to a similar or identical standard resulting in a similar frequency response. The addition of material after identifying the frequency response allows the frequency response to be tailored to achieve a desired result to suit the application. As the material is added into a cavity, the external shape of the portion is retained, which is especially important in blade applications. Also, for in-service replacements only a single standard of blade needs to be carried in the replacement inventory, and the frequency response of the blade to be replaced may be reproduced by adding the material as required.

Additionally, since a filler material is being added to the blade, this reduces the number of metal removal and metal finishing operations which must be performed. Hence the risk of rejection of the component through machining error is reduced.

Preferably the method further comprises the steps of: providing a second portion of the component, and identifying a second frequency response of the second portion.

The adjusted frequency response of the first portion is more similar to the second frequency response of the second portion than is the first frequency response of the first portion, for a predetermined range of frequencies. In this manner, the component may be tuned to exhibit oscillation at a known frequency which is out of, or on the limits of, the operating range of the application (eg below idle speed of an engine). Alternatively, if oscillation is desired at a certain frequency, the component can be tuned to achieve this.

Alternatively, the adjusted frequency response of the first portion is less similar to the second frequency response of the second portion than is the first frequency response of the first portion, for a predetermined range of frequencies. In this manner, the component may be de-tuned such that the frequencies at which the individual portions oscillate differ, and as such the blades will not oscillate in unison, reducing the above described negative effects.

Preferably the step of identifying the second frequency response comprises measuring the second frequency response ie instead of simply identifying the first frequency response by, for example, referring to a manufacturing log when it was first manufactured, or calculating it from the portion properties, the first frequency response may be measured by any known method.

Embodiments of the invention will now be described with reference to the accompanying drawings, in which:—

Figure 1:
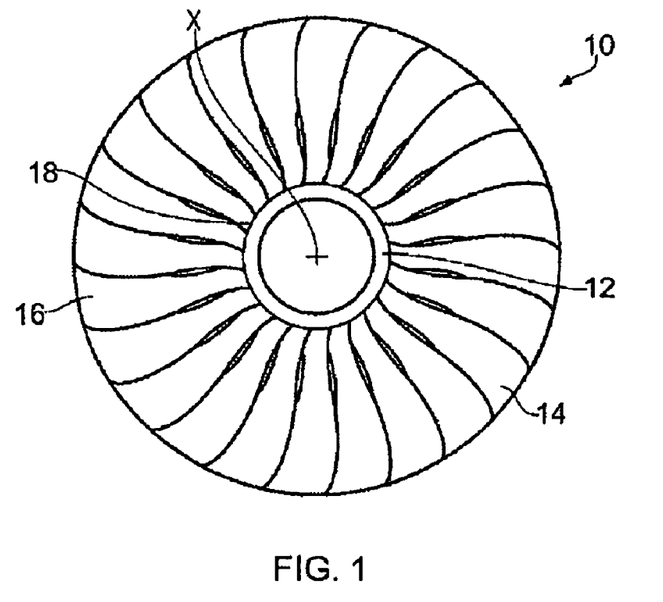
FIG. 1 is a front view of a known fan blade assembly.

Referring to FIG. 1, a known fan blade assembly 10 is shown. The known fan blade assembly 10 comprises a disk, or hub 12 around which are positioned a plurality of circumferentially spaced blades 14. Each blade 14 comprises an aerofoil 16 integral with a blade root 18 which connects to the hub 12 in order to retain the blade in position. In alternative arrangements, the hub 12 and blades 14 are formed as a single component, known as a blisk.

In use, the main shaft of a gas turbine engine (not shown) is non-rotationally attached to the hub 12 such that the entire assembly 10 rotates about axis X when the gas turbine engine operates.

Each of the blades 14 has a frequency response. As the blades 14 are substantially similar, the frequency response of each blade is also substantially similar. As such, the assembly 10 has a frequency response with high amplitude oscillations at substantially similar frequencies to each individual blade 14. As such, vibration of the assembly 10 by the turbine shaft (not shown) at these frequencies results in large amplitude oscillations and potential damage to the assembly and surrounding components as described.

Figure 2:
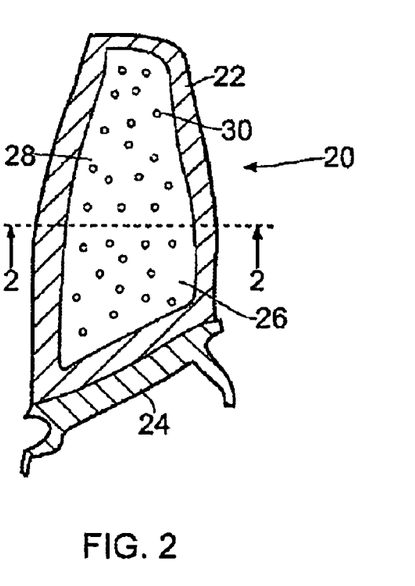
FIG. 2 is a cross-sectional view of an individual blade made in accordance with a first embodiment of the present invention.

A blisk 20 is shown in FIG. 2 in accordance with a first embodiment of the present invention. Blisk 20 comprises an aerofoil, or fan blade body 22 and a root/disk 24. The fan blade body 22 comprises a cavity 26 suitable for receiving a damping material 28, specifically a hardening visco-elastic material capable of damping vibrations of the blade 22, although any suitable material may be used.

The filler material 28 can be a visco-elastic material containing a plurality of hollow glass spheres 30. These hollow spheres 30 do not significantly impact the damping performance of the filler material 28, but rather simply occupy space in the cavity 26 such that less of the visco-elastic component of the filler material 28 can be inserted into cavity 26. Therefore by varying the number of hollow spheres 30 in a given mass of filler material 28, it is possible to alter the density of the filler material (as the visco-elastic component is generally heavier than air). In this manner, it is possible, for example, to fill a first blade with a high density filler material 28 (with a low number of spheres 30) and an adjacent blade with a low density filler material (ie with a high number of spheres 30). Alternatively, filler materials 28 and hollow spheres 30 of different densities could be combined to achieve a desired weight distribution. The density of the filler material 28 may be varied by using hollow spheres 30 of different diameter. The end result of such processes would be two blades 20 with substantially identical geometry and damping properties, however with significantly different masses.

Fillers 28 of differing stiffness may be used to vary the degree of damping. This may be achieved by adding amounts of materials such as starch or clay to the filler mixture 28.

As the mass of the fan blade 20 affects the frequency response, two such blades made as described above will exhibit different frequency responses. This will be discussed further below.

Figure 3:
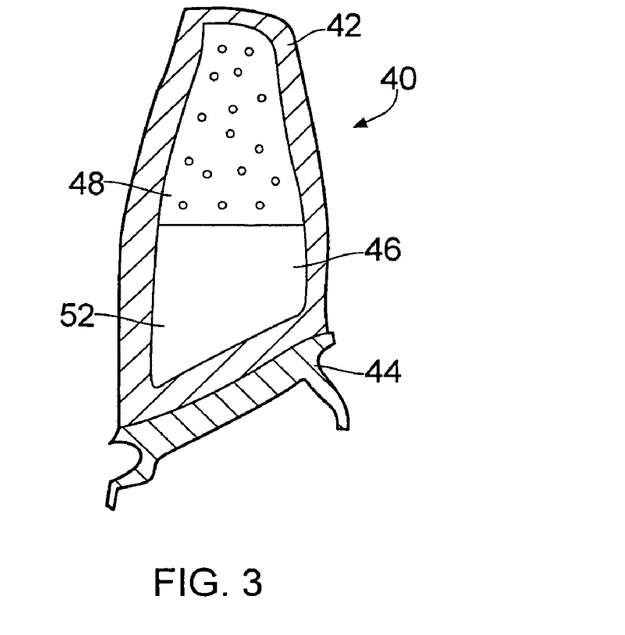
FIG. 3 is a cross-sectional view of a blade made in accordance with a second embodiment of the present invention.

Referring now to FIG. 3, a fan blade 40 made in accordance with a second embodiment of the present invention is shown. The fan blade 40 is substantially similar to the fan blade 20 comprising an aerofoil 42, a root 44 and a cavity 46.

However the cavity 46 is only partially filled with a visco-elastic filler material 48. A remaining part 52 of the cavity 46 remains empty. In this particular embodiment the blade 40 was inverted with respect of FIG. 3 when being filled such that the visco-elastic filler material sits near to the tip of the blade 40.

It will be noted that the weight of the blade 40 may be changed selectively by varying the amount of filler 48 present in the cavity 46. As such, the frequency response of blade 40 can be altered in a similar way to blade 20.

Because the blade 40 is effectively a cantilever in-use, with root 44 built-in, the damping properties of the filler 48 are most useful near the blade tip as this is the region of highest displacement. It is therefore preferable that the damping material be positioned here. Therefore the vacancy of the portion 52 has little effect on the damping effect of the filler material 48.

Figure 4:
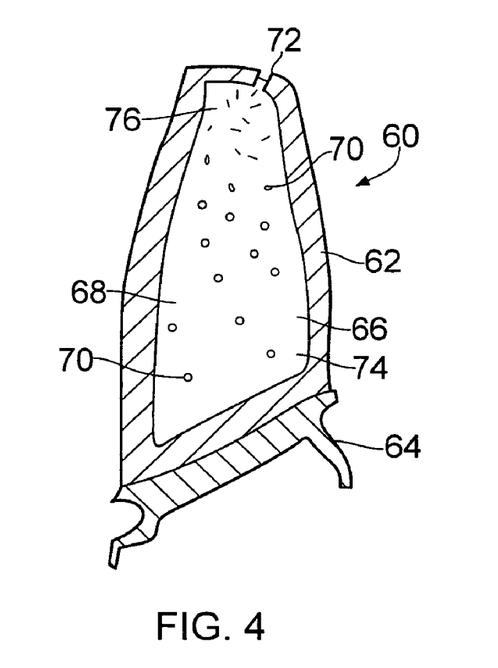
FIG. 4 is a cross-sectional view of a blade made in accordance with a third embodiment of the present invention.

Referring now to FIG. 4, a blade 60 is shown made in accordance with a third embodiment of the present invention. The blade 60 is substantially similar to blade 40 but it will be noted that a cavity 66 has been completely filled with a filler material 68.

In this embodiment, the filler material 68 contains a plurality of compressible hollow spheres 70. The filler material 68 is injected into the cavity 66 via an aperture 72. However, instead of stopping the flow of filler material 68 through the aperture 72 when the cavity 66 is full, it continues to be fed in such that a pressure gradient builds up from the root 64 to the tip of the blade 60.

As such the cavity 66 contains filler material 68 ranging from a lower pressure region 74 near the root to a high pressure region 76 near the tip. It will be noted that because the spheres 70 are compressible, this high density can be achieved with a substantially incompressible visco-elastic damping material. An increased density of, for example, 20% may be achieved at the high density region 76 over the low density region 74.

As the filler material 68 is of a controllable density, it is possible to vary the weight of the blade 60 and hence the frequency response in a similar manner to blades 20 and 40.

It should also be noted that the high pressure region can be moved by altering the position of the aperture 72. For example, a centre-fill, root-fill or combined root and tip fill may be appropriate for creating different locations with one or more high density regions 76. Other patterns may be achieved by allowing the filler to set in one region before injecting and pressurising filler in an adjacent region.

Figure 5:
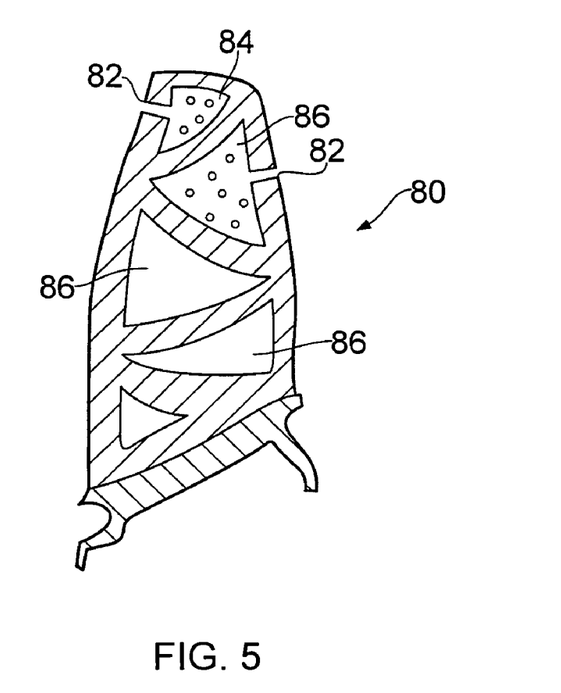
FIG. 5 is a cross-sectional view of a blade made in accordance with a fourth embodiment of the present invention.

A fan blade 80 made in accordance with a fourth embodiment of the present invention is shown in FIG. 5. As can be seen, the fan blade 80 comprises a plurality of cavities 86. Utilising apertures 82, the cavities 86 may be selectively filled to provide a desired distribution of a filler material 84. Again, this allows for the filler material 84 to be positioned at the tip of the blade where it is most needed, and also for the mass distribution of the filler material 84 to be controlled such that the frequency response of individual blades 80 can be varied. It should be noted that each cavity may also be filled in accordance with any of the previous embodiments 20, 40, 60.

Figure 6:
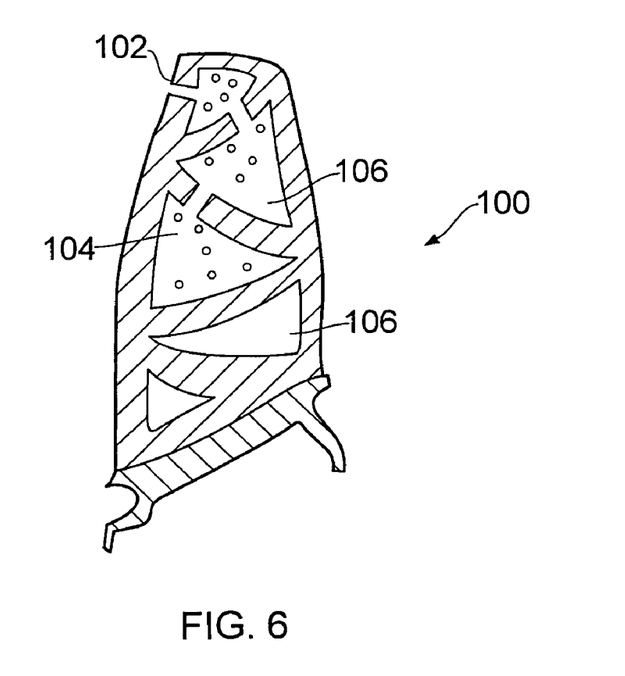
FIG. 6 is a cross-sectional view of a blade made in accordance with a fifth embodiment of the present invention.

Another fan blade 100 is shown in FIG. 6 which is substantially similar to blade 80. However, the parts of the blade 100 delimiting the cavities 106 have orifices therethrough such that only a single aperture 102 need be utilised in order to provide filler material 104 into the cavities 106.

Figure 2A:
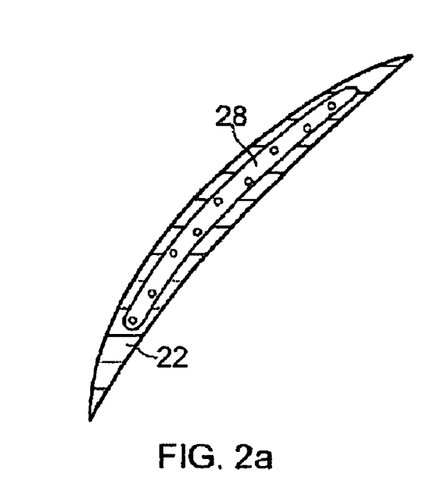
FIG. 2a is a cross-sectional view of the blade of FIG. 2 along line 2-2.

It should be noted that as shown in FIG. 2a, each of the cavities 26, 46, 66, 86, 106 are substantially completely enclosed within the aerofoil with the exception of orifices with which to fill the cavities. As such the impinging airflow when in use does not contact the filler material, and the surface finish of the blade is intact.

As discussed above with respect to blades 20, 40, 60, 80, 100, it is possible to vary the frequency response of individual blades of an assembly by effectively altering the mass. Additionally, the mass distribution of the filler may be shifted axially (ie along axis X in FIG. 1) by using any of these techniques. This has the benefit of separating the frequencies at which different modes of response occur, for example the flap and torsion modes that can cause flutter when at similar frequencies.

Figure 7:
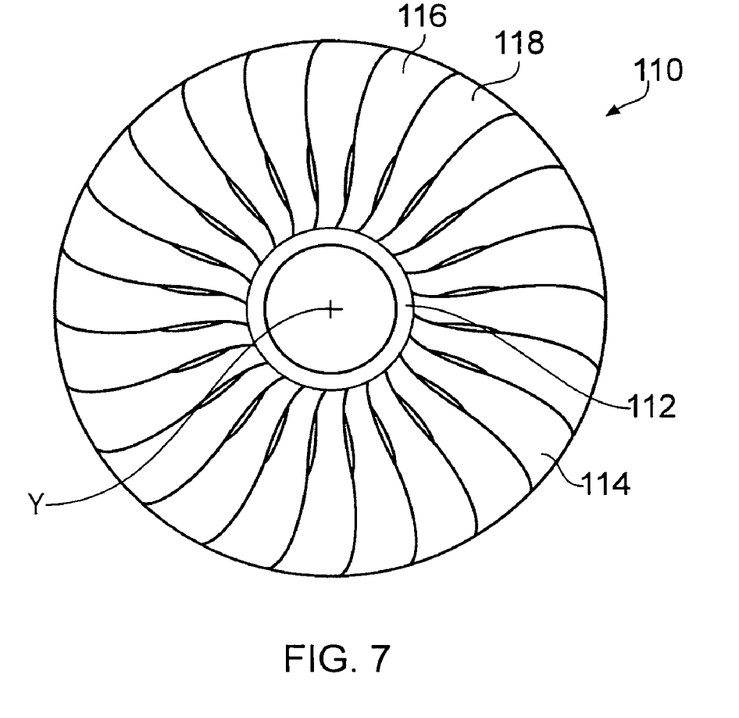
FIG. 7 is a front view of a fan blade assembly made in accordance with the present invention.

Referring to FIG. 7, the fan blade assembly 110 comprises a hub 112 and a plurality of blades 114 manufactured in accordance with the present invention.

Figure 8:
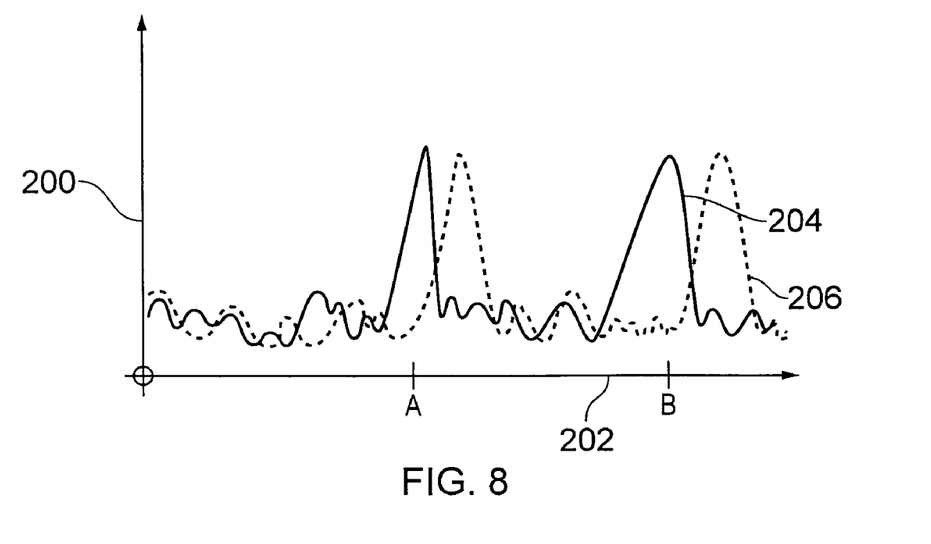
FIG. 8 is a comparison of frequency responses of components made in accordance with the present invention.

In use, the assembly 110 rotates about axis Y on the engine shaft (not shown). The assembly 110 comprises a first fan blade 116 and a second fan blade 118. Referring now to FIG. 8, a frequency response graph is shown with an amplitude axis 200 and a frequency axis 202. The frequency response of blade 116 is shown at 204, and it can be clearly seen that the response comprises peaks at frequency A and frequency B on axis 202 indicating high amplitude oscillation at these frequencies. As such, if the entire assembly 110 was constructed from blades 116, forced vibration of the assembly 110 at either frequency A or frequency B would likely result in resonance and potential damage to componentry through high amplitude vibration.

In the present embodiment the assembly 110 further comprises a fan blade 118 adjacent to fan blade 116. Fan blade 118 has had its frequency response adjusted by any of the methods mentioned above with reference to the fan blades 20, 40, 60, 80 or 100. As such, an adjusted frequency response for fan blade 118 is shown by line 206.

It can be clearly seen that the adjusted frequency response of fan blade 118 has different peaks to that of fan blade 116. As such the blades will not resonate at the same frequency as A and B and thus the accumulated resonance hereinbefore described is tempered. The adjacent blades 116 and 118 are effectively "de-tuned" without significant degradation of the damping ability of the filler material.

It should be noted that the frequency of the blade may be alternated in this fashion so that no two adjacent blades have the same or similar frequency response. Alternatively the frequency response of the blades of the assembly 110 may be randomised such that no two blades have the same resonant peaks.

Alternatively, the filler material may be used to control the resonant peaks of the frequency response of the blades and tune the blades of the assembly 110 such that they resonate at the same frequency, albeit a frequency that is never used by the engine. This may be a below idle frequency (which will only be seen very briefly on starting of the engine) or indeed a frequency that exceeds the maximum and/or take-off rating of the engine.

It will be appreciated that advantageously the frequency characteristics of the fan blades can be adjusted post-metal manufacture and furthermore in service if required.

Therefore, manufacturing to multiple standards is no longer required reducing parts and tooling costs. It is also not necessary to source blades of the correct characteristics when replacement is required as an off-the-shelf blade can be used with a post-manufacture inserted amount of filler to meet the required frequency response.

It will be appreciated that the invention can not only be used on assemblies but also one piece hubs and blades (blisks), and indeed any type of rotating component where frequency response is important.

It should also be appreciated that the damping material may not be a filler but could be an interior lining of the cavities.

Figure 9:
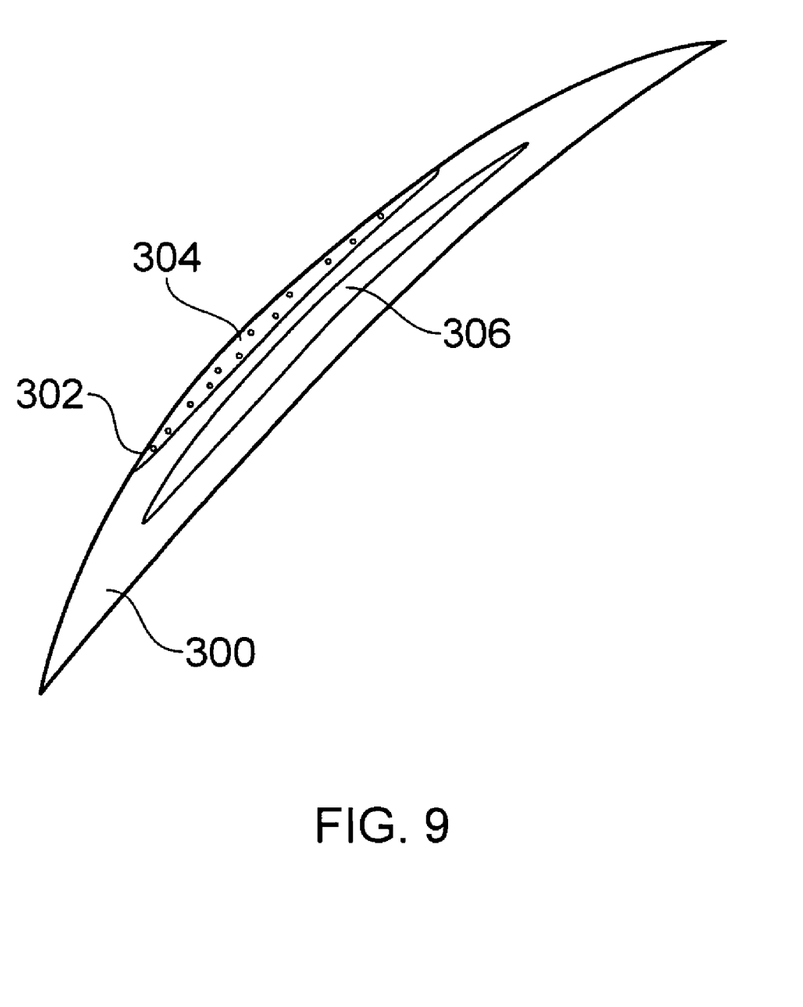
FIG. 9 is a cross-sectional view of a blade according to an alternative embodiment of the invention.

Shown in FIG. 9 is an alternative embodiment in which a blade 300 is provided with a cavity 302 on an external surface. The cavity 302 is filled with filler 304, and shaped to form a desired aerodynamic profile. The blade 300 may additionally be formed with an internal cavity 306 which may also be filled with a filler material.

While the present invention has been described with reference to rotatable components, it is equally applicable to static components. In the case of static vanes/aerofoils it is the flow of air over the vanes which forces the vibration.

Consequentially the degree of adjustment of the frequency response and the means by which it is achieved may differ from that for rotatable components, although the general principles remain the same. Never-the-less such tuning is equally beneficial, particularly for thin walled structures.

The invention claimed is:

1. A method of manufacturing a rotor for a gas turbine engine, the method comprising the steps of:
   providing the rotor for the gas turbine engine having a first portion, which first portion defines a cavity,
   identifying a first frequency response of the first portion and/or the entire rotor, and
   introducing material into the cavity, and pressurizing the material in the cavity to provide a pressure gradient in the material in the cavity, and thereby achieve an adjusted frequency response of the first portion and hence a desired frequency response of the rotor.

2. A method of manufacturing according to claim 1, further comprising the steps of:
   providing a second portion of the rotor, and
   identifying a second frequency response of the second portion.

3. A method of manufacturing according to claim 2, in which the adjusted frequency response of the first portion is more similar to the second frequency response of the second portion than is the first frequency response of the first portion, for a predetermined range of frequencies.

4. A method of manufacturing according to claim 2, in which the adjusted frequency response of the first portion is less similar to the second frequency response of the second portion than is the first frequency response of the first portion, for a predetermined range of frequencies.

5. The method of manufacturing of claim 2 in which the step of identifying the second frequency response comprises measuring the second frequency response.

6. The method of manufacturing of claim 1 in which the step of identifying the first frequency response comprises measuring the first frequency response.

7. The method of manufacturing of claim 1 in which the step of introducing the material causes movement of the centre of mass of the rotor axially.

8. The method of manufacturing of claim 1 in which after the step of identifying the first frequency response, and before the step of introducing the material, comprises the step of determining the amount of material to be introduced.

9. The method of manufacturing of claim 1 in which:
   the material comprises a first phase and a second phase, the first phase and the second phase being of substantially different density, and;
   the adjusted frequency response is achieved by varying the ratio between the first phase and the second phase of the material that is introduced into the cavity.

10. The method of manufacturing of claim 9 in which the material is a syntactic foam.

11. The method of manufacturing of claim 1, in which the step of providing the rotor having the first portion comprises the step of providing the first portion with a plurality of cavities, and the step of introducing material comprises selectively filling the plurality of cavities.

12. The method of manufacturing of claim 1 in which the rotor is an integral component.

13. The method of manufacturing of claim 1 in which the material is a filler material.

14. The method of manufacturing of claim 1 in which the material lines the cavity.

15. The method of manufacturing of claim 1 in which the material comprises a viscoelastic material.

16. The method of manufacturing of claim 1 in which the cavity is substantially completely enclosed.

17. A method of manufacturing as claimed in claim 1 in which the cavity is provided on an external surface of at least one of the first or second portions.

* * * * *